United States Patent
Ren et al.

(10) Patent No.: US 8,755,573 B2
(45) Date of Patent: Jun. 17, 2014

(54) TIME-OF-FLIGHT SENSOR-ASSISTED IRIS CAPTURE SYSTEM AND METHOD

(75) Inventors: Liu Ren, Sunnyvale, CA (US); Xinyu Huang, Norfolk, VA (US); Ruigang Yang, Lexington, KY (US)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 13/269,519

(22) Filed: Oct. 7, 2011

(65) Prior Publication Data

US 2012/0027266 A1 Feb. 2, 2012

Related U.S. Application Data

(63) Continuation of application No. 13/024,972, filed on Feb. 10, 2011, now Pat. No. 8,059,870, which is a continuation of application No. 12/367,005, filed on Feb. 6, 2009, now Pat. No. 7,912,252.

(51) Int. Cl.
*G06K 9/00* (2006.01)

(52) U.S. Cl.
USPC .................................. 382/117; 382/115

(58) Field of Classification Search
USPC .................................. 382/115–117
See application file for complete search history.

(56) References Cited

U.S. PATENT DOCUMENTS

| | | | |
|---|---|---|---|
| 7,164,784 B2* | 1/2007 | Beardsley | 382/154 |
| 7,599,847 B2* | 10/2009 | Block et al. | 705/5 |
| 7,627,147 B2* | 12/2009 | LoIacono et al. | 382/117 |
| 2005/0084137 A1* | 4/2005 | Kim et al. | 382/115 |
| 2007/0274570 A1* | 11/2007 | Hamza | 382/117 |
| 2010/0187311 A1* | 7/2010 | van der Merwe et al. | 235/462.01 |

* cited by examiner

*Primary Examiner* — Wesley Tucker
(74) *Attorney, Agent, or Firm* — Maginot, Moore & Beck

(57) ABSTRACT

A method of identifying a living being includes using a time-of-flight sensor to determine a location of a face of the living being. An image of an iris of the living being is produced dependent upon the location of the face as determined by the time-of-flight sensor. The produced image is processed to determine an identity of the living being.

18 Claims, 12 Drawing Sheets

TIME-OF-FLIGHT SENSOR-ASSISTED IRIS CAPTURE SYSTEM AND METHOD

CROSS-REFERENCE TO RELATED APPLICATIONS/INCORPORATION BY REFERENCE

This application is a continuation of U.S. patent application Ser. No. 13/024,972 entitled "TIME-OF-FLIGHT SENSOR-ASSISTED IRIS CAPTURE SYSTEM AND METHOD", filed Feb. 10, 2011, which is a continuation of U.S. patent application Ser. No. 12/367,005, now U.S. Pat. No. 7,912,252, entitled "TIME-OF-FLIGHT SENSOR-ASSISTED IRIS CAPTURE SYSTEM AND METHOD", filed Feb. 6, 2009. The complete subject matter of these patent applications is hereby incorporated herein by reference, in their entireties.

BACKGROUND

1. Field of the Invention

The present invention relates to apparatuses and methods for identifying personnel and, more particularly, to apparatuses and methods for identifying personnel based on visual characteristics of the irises of their eyes.

2. Description of the Related Art

Iris recognition, or "iris capture" is a method of biometric personal identification that uses pattern recognition algorithms based on images of at least one of the irises of an individual's eyes. Iris recognition uses camera technology to produce images of the details of the iris. These images are converted into digital templates and provide mathematical representations of the iris that are used to identify individuals.

Many iris capture systems with low levels of intrusiveness have been proposed to extend the operational range for iris capture in recent years. For example, a system has been proposed that consists of multiple synchronized high-speed, high-resolution, and narrow-field-of-view (NFOV) video cameras, in which system focus is fixed at a portal about three meters away from the camera. This is the first system that could be used in practice for iris capture over long distances with a high throughput (e.g., twenty persons per minute). However, the depth of field (DOF) for each user is limited (e.g., five to twelve centimeters). With the limited DOF, it is possible that a same user would need to pass the portal multiple times before a clear iris image is captured.

Other types of systems employ one high resolution camera with either an autofocus or a fixed focus lens for the capture. The depth information of the subject is usually needed in these systems, which can be estimated implicitly based on the scale or the size of the captured two-dimensional face, or can be computed based on a pair of high speed video cameras using stereo vision. Because the acquired depth information based on these methods is not very accurate, these systems are not robust enough for practical use. For example, the feature matching in the stereo cameras is not always accurate under different lighting conditions. As a result, the robust sub-pixel matching is not easy to achieve in practice. Furthermore, the accuracy of a stereo vision system also depends on the length of the baseline. High accuracy would require a longer baseline, which make it impossible to build a compact iris capture system for many security applications.

Even though cameras with high shutter speed are often used in these systems, users still need to remain still for several seconds so that the high quality iris image can be captured. This is because defocus blur can easily happen when a moving subject is captured with a significant amount of system delay because of the slow movements of the pan-tilt unit or because of a long autofocus time. The accurate depth information (i.e., distance from the user to the camera) provided by these systems could be used for iris deblurring and therefore to enhance the performance of the whole system.

What is neither disclosed nor suggested in the art is an iris capture system with an extended operational range, and that does not rely on the person remaining motionless for a period of a few seconds or more.

SUMMARY

The present invention provides a less intrusive iris capture system that combines a commercial off-the-shelf (COTS) high resolution camera with near infrared (NIR) illumination and a time-of-flight (TOF) depth sensor.

In one embodiment, the present invention comprises a method of identifying a living being, including using a time-of-flight sensor to determine a location of a face of the living being. An image of an iris of the living being is produced dependent upon the location of the face as determined by the time-of-flight sensor. The produced image is processed to determine an identity of the living being.

In another embodiment, the present invention comprises a system for identifying a living being. The system includes a time-of-flight sensor positioned to sense a face of the living being within a predetermined space. A camera is positioned to capture an image of an iris of the living being within the predetermined space. A processor is in communication with each of the time-of-flight sensor and the camera. The processor receives information about a location of the face of the living being from the time-of-flight sensor, determines whether one or two eyes of the living being are within the field of view of the camera, receives the captured image from the camera, estimates defocus blur kernel, applies deblurring for the captured image if it is blurred, and determines an identity of the living being based on the captured image.

In yet another embodiment, the present invention comprises a method of identifying a living being, including using a time-of-flight sensor to ascertain a 3D or 2D shape of a face of the living being. An image of an iris of the living being is captured. An identity of the living being is determined based on the ascertained shape of the face of the living being captured from the TOF sensor and based on the captured image of the iris of the living being.

An advantage of the present invention is that it provides an extended depth of field (DOF), an enlarged capture volume, and an improved capturing speed.

Another advantage is that a time-of-flight (TOF) sensor is used in the iris capture system, which provides accurate depth information from the depth map and allows the system to locate the three-dimensional eye position accurately so that the iris/face can be captured accurately.

Yet another advantage is that the accurate depth information provided by a TOF sensor can allow the system to perform fast capture as the focus position can be quickly calculated for cameras with adjustable focus. In contrast, autofocus is usually slow in this case.

Still another advantage is that the depth information provided by the TOF sensor can be used to estimate the blur kernel for the iris deblurring. Defocus blur can easily occur in such systems, which is an issue that can seriously affect the system performance.

A further advantage is that the depth information provided by the TOF sensor for the subject's face may be used to estimate the three-dimensional geometry of the subject's face, which can enable a low cost face recognition system including multimodal (i.e., three-dimensional face shape and iris) integration.

A still further advantage is that the TOF sensor allows a compact and portable design for iris capture for many security applications (e.g., access control or border control).

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
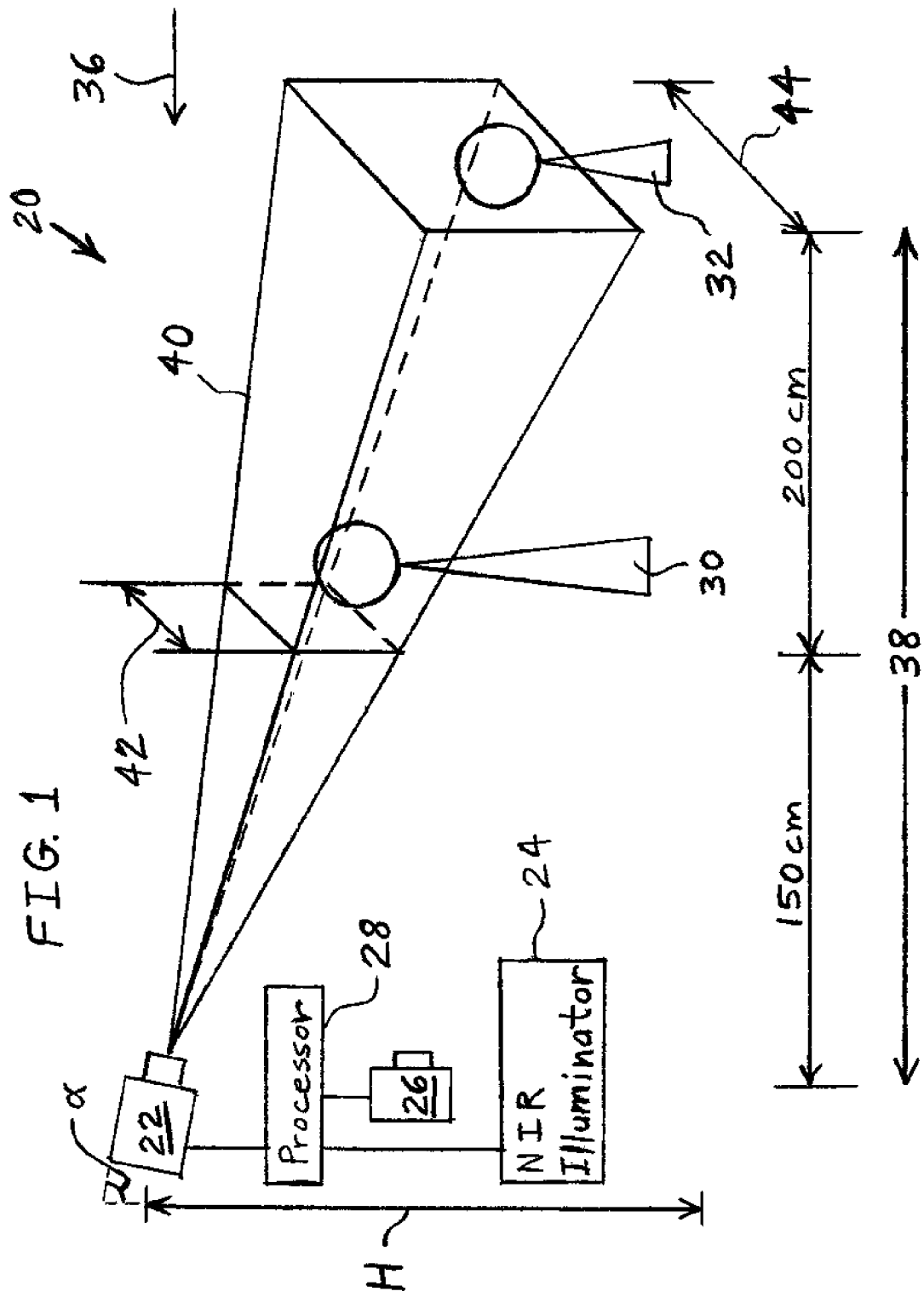
FIG. 1 is a block diagram of one embodiment of an iris capture system according to one embodiment of the invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Turning now to the drawings, and particularly to FIG. 1, there is shown one embodiment of an iris capture system 20 of the present invention including an NFOV NIR camera 22 with adjustable focus, an NW illuminator 24, and a depth sensor 26 all in electronic communication with a central processor 28. System 20 may capture images of, and detect the positions of, moving subjects such as a human being 30 or a human being 32 when he approaches a doorway at which camera 22, illuminator 24 and sensor 26 are mounted, such as in a direction indicated by arrow 36. Camera 22 may be installed with a mounting height H and tilt angle $\alpha$ such that a standoff distance 38 for the user is approximately between 1.5 meters and 3.5 meters and the captured iris diameter is above 150 pixels. In one embodiment, height H is about 250 centimeters. The width of a capture volume 40 may be on the order of 20 centimeters. In the embodiment illustrated in FIG. 1, a width 42 of capture volume 40 where the image and shape of the taller person 30 are captured is about 17 centimeters, and a width 44 of capture volume 40 where the image and shape of the shorter person 32 are captured is about 30 centimeters. There are many devices known for measuring depth information, such as stereo cameras, time-of-flight sensors, and structure lights.

In embodiments in which NFOV camera 22 does not have panning and tilting capabilities, the human being whose image and shape are being captured needs to look at camera 22 while approaching the doorway. The iris capture may be triggered at different standoff distances for users with different heights.

Depth sensor 26 may be installed at various positions and orientations. TOF sensor 26 may be positioned very close to NFOV camera 22 to allow for a more compact design. NW illuminator 24 can be placed at any location so long as it illuminates capture volume 40.

System 20 can be applied to other possible settings in which depth sensor 26 is used. For example, camera 22 may be in the form of a high speed, high performance video camera. Alternatively, camera 22 may have a fixed focus or adjustable focus based on the distance between the camera and the user. It is also possible for camera 22 to include pan-tilt capabilities in order to further enlarge the capture volume.

Figure 2:
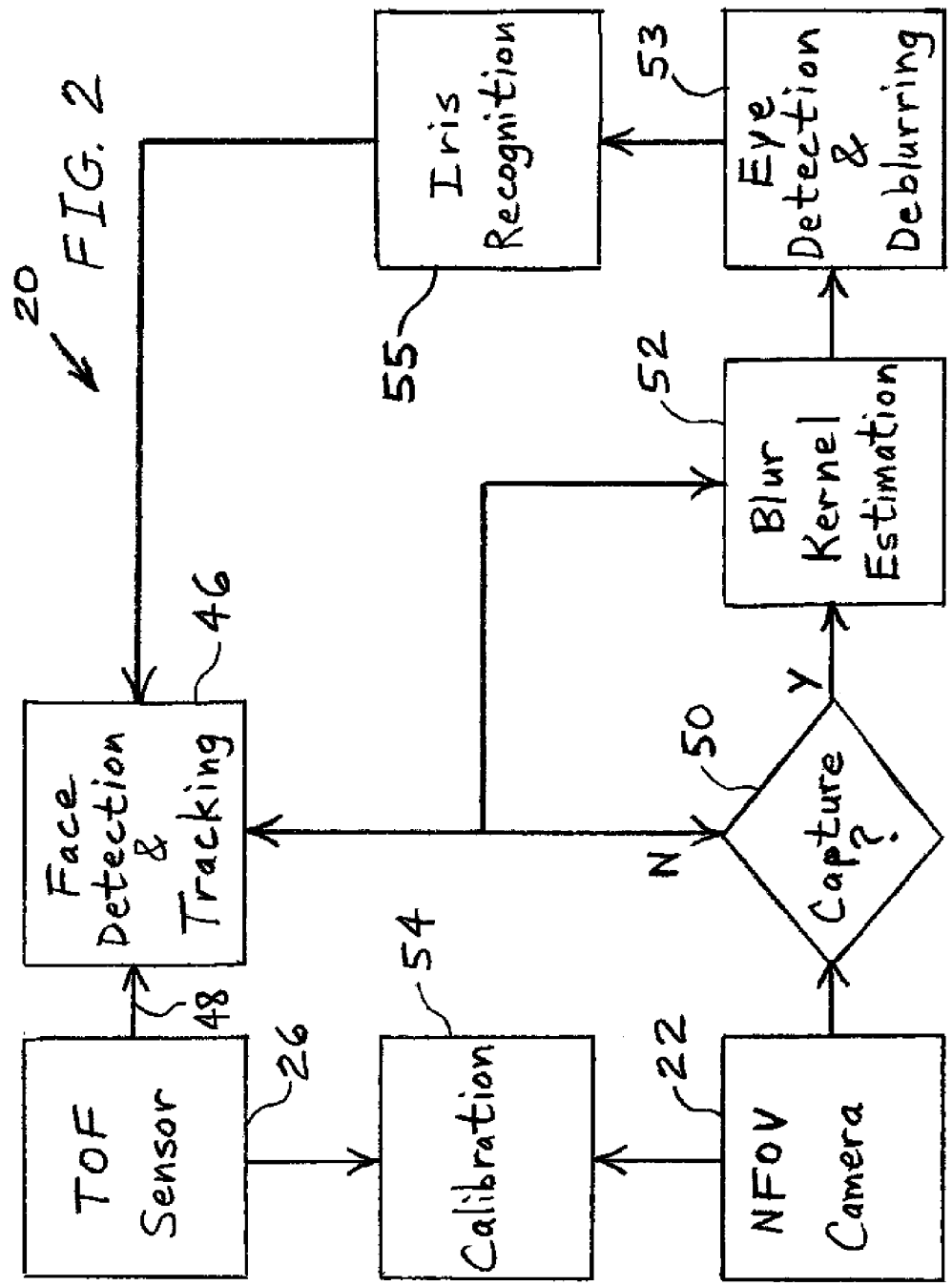
FIG. 2 is an operational block diagram of the iris capture system of FIG. 1.

An operational block diagram of system 20 is illustrated in FIG. 2. The three-dimensional information measured by depth sensor 26 may be used in various ways within system 20. First, face detection and tracking 46 may be performed on the up-sampled intensity images 48 captured by depth sensor 26. The three-dimensional position of the eyes may then be estimated from an upper portion of the detected face depth maps. The next eye location for the moving subject may be predicted accurately in real time. For example, time rates of change of the three-dimensional position of the eyes may be extrapolated to predict future eye locations. Second, the three-dimensional position may be used to determine whether eyes are within the field of view and whether the stand-off distance is within the depth of field. If these two conditions are satisfied, the NFOV camera may be instructed to perform image capturing, as at 50. Third, the depth information may be used to dynamically control the focus position of the lens of NFOV camera 22. Finally, the depth information can be used to estimate the blur kernel 52 for iris deblurring, as at 53. The deblurring may be useful in an iris recognition algorithm 55. More accurate depth information could be used to predict the speed and future positions of the human being so that the real or desired focus position can be estimated more accurately even when the system delay exists. The real or desired focus position may represent the focus position that is ideal for the future estimated position of the human being.

Calibration between NFOV camera 22 and depth sensor 26 may be performed, as at 54. In one embodiment, depth sensor 26 could be a TOF sensor. Many existing TOF sensors contain systematic depth bias from the demodulation of correlation function and incident lights, and so calibration, or so-called "precalibration," of the TOF sensor may obtain a better depth measurement. In a first step of a novel calibration method of the present invention, a large planar board may be positioned at different depths and with different orientations. A robust plane fitting may then be applied for the planar board at each position. The depth bias may be estimated by computing the difference between measured depth and the fitted plane. After the calibration of TOF sensor 26, the depth uncertainty may be greatly reduced, especially the depth uncertainty between 1.3 and 2 meters. In order to transform the depth in the coordinate system of TOF sensor 26 to that of NFOV camera 22, a full system calibration may be performed. The NFOV camera with a telephoto lens may be approximated as an affine camera. A planar checkerboard pattern is captured at different depths. As the correspondences between the two-dimensional points x from NFOV camera 22 and three-dimensional points X from TOF sensor 26 are known, the projection matrix P can be computed by minimizing the re-projection errors. The intrinsic and extrinsic matrices may be obtained by RQ decomposition of P.

A second method to calibrate between NFOV camera 22 and TOF sensor 26 is a non-parametric method. A small planar pattern may be positioned at different 3D locations within the field of view of TOF sensor 26. The 3D locations visible to the NFOV camera 22 are recorded and further construct a 3D convex hull in the coordinate system of TOF sensor 26. When TOF sensor 26 is mounted close enough to the NFOV camera 22, the distance between eyes and NFOV camera 22 may be approximated by the depth information measured by TOF sensor 26. When a living being enters the field of view of TOF sensor 26 and either eye's location is inside the pre-computed convex hull, then the eye is also within the field of view of NFOV camera 22.

Blur kernel estimation step 52 for iris deblurring is optional. As long as the iris deblurring algorithm needs to use the accurate depth information, the depth information provided by TOF sensor 26 may be sufficient. When depth information is not available in capturing systems, some statistics of the captured image (e.g., focus scores) may be used to estimate blur kernel.

Image blur may be modeled as a convolution process:

$$I = L \otimes h + n \quad (1)$$

where I, L, h, and n represent the blurred image; un-blurred image; point spread function (PSF) or blur kernel; and additive noise, respectively. For defocus blur, the PSF h depends on the circle of confusion R. For cameras with adjustable focus, R is a function of two parameters based on the typical pin-hole camera model. The two parameters are the distance from the object to the lens d and the distance between the lens and the image plane s, $$R = \frac{Ds}{2}\left|\frac{1}{f} - \frac{1}{d} - \frac{1}{s}\right| \quad (2)$$

where D is the radius of the lens, and f is the focal length of the lens. For cameras with fixed focus s, R is determined only by d.

The PSF h for the defocus blur may be modeled as a Gaussian kernel, $$h = \frac{1}{2\pi\sigma_h^2} e^{-\frac{x^2+y^2}{2\sigma_h^2}}. \quad (3)$$

Because the captured eye region is usually parallel to the image plane, the PSF h may be shift-invariant.

The blur kernel estimation method of the present invention will now be described with the assumption in place that the depth difference is measured. When the fixed focus cameras are used, it is relatively simple to estimate the kernel. The kernel estimation method of the present invention may deal with the more general case, i.e., cameras with adjustable focus. As mentioned above, the depth difference may be mainly caused by the system delay when a subject is moving.

As the lens focus position $p_f$ is proportional to the distance between the lens and image plane s, when the circle of confusion R is small enough, the relationship between the in-focus position of lens $p_f$ and d may be derived based on Equation (2), $$p_f = \frac{d}{k_1 d + k_2}. \quad (4)$$

Figure 3:
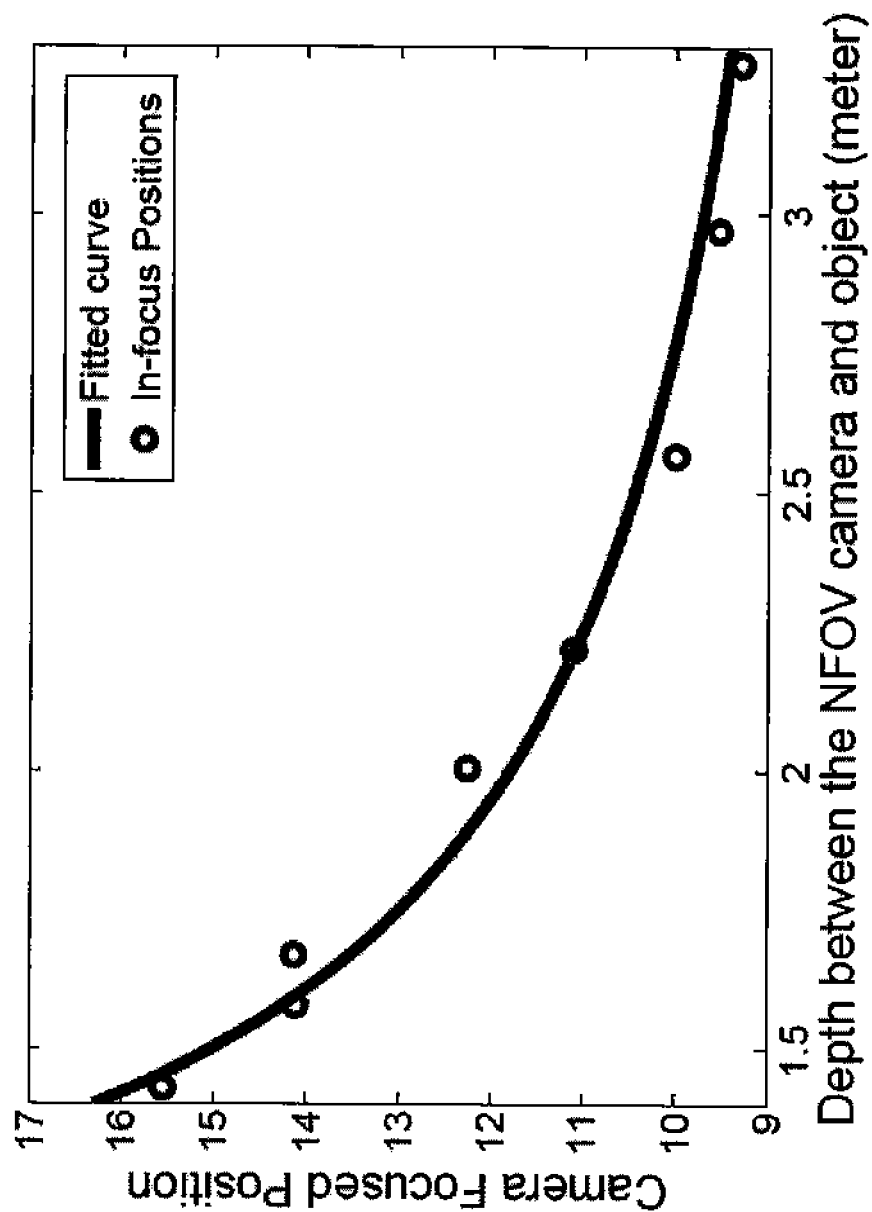
FIG. 3 is an example of a fitted curve for the measured focus positions of the camera of the system of FIG. 1 as a function of the depth between the camera lens and the object.

After measuring focus positions from in-focus images at different depths, $k_1$ and $k_2$ can be easily estimated by curve fitting using Equation (4). FIG. 3 shows an example of a fitted curve for the measured focus positions and depths.

As the standard deviation of the blur kernel Gaussian distribution $\sigma_h$ is proportional to R and s is proportional to $p_f$, when d is fixed, the relationship between $\sigma_h$ and $p_f$ may be derived, based on Equation (2), $$\sigma_h = |k_3 p_f + k_4|. \quad (5)$$

Although the parameters $k_1$, $k_2$, $k_3$ and $k_4$ are characteristics of the camera system, they have no obvious physical meaning or representation. The standard deviation $\sigma_h$, which defines the blur kernel Gaussian distribution, cannot be measured directly. Thus, the following novel algorithm of the present invention may estimate $\sigma_h$ and then learn $k_3$ and $k_4$ accordingly.

In a first step of the algorithm, in-focus and defocused checkerboard images are captured under different depths and different focus positions. As in-focus and defocused images are known, only $\sigma_h$ is unknown. The standard deviation $\sigma_h$ is estimated by $\mathrm{argmin}_{\sigma_h}\|I - L \otimes h\|_2^2$. The subscript 2 in the formula denotes a Euclidean Norm or a L2-Norm.

In a next step, $k_3$ and $k_4$ are estimated by $\mathrm{argmin}_{k_3,k_4}\|k_3 p_f + k_4 - \sigma_h\|_2^2$.

FIGS. 4*a-g* show examples of the fitting results for $p_f$ and $\sigma_h$ based on Equation (5). FIGS. 4*a-g* are plots of the focus position of camera 22 versus a standard deviation of the blur kernel distribution for six different distances between camera 22 and the subject iris. The plot for each of the six distances is V-shaped, with the origin of the "V" being at the in-focus position corresponding to that distance. The parameter $k_3$ may represent the slope of a corresponding V-shaped plot in FIGS. 4*a-g*; and parameter $k_4$ may represent the y-intercept of the corresponding V-shaped plot. V-shaped plot 60 corresponds to a distance of about 3.30 meters; V-shaped plot 62 corresponds to a distance of about 2.97 meters; V-shaped plot 64 corresponds to a distance of about 2.56 meters; V-shaped plot 66 corresponds to a distance of about 2.00 meters;

V-shaped plot 68 corresponds to a distance of about 1.58 meters; and V-shaped plot 70 corresponds to a distance of about 1.43 meters.

Each of the circles in FIGS. 4*a*-*g* represents an empirically-collected data point. The data points at the top (standard deviation=20) of FIGS. 4*a*-*g* are the images that are severely blurred. It may not be feasible to recover these kinds of severely blurred images in practice even with a large kernel size. Hence, these severely blurred images are treated as outliers and are not included in the estimation.

Based on FIGS. 3 and 4*a*-*g*, it can be concluded that the models described in Equations (4) and (5) may be used for real camera systems even though the derivation of Equations (4) and (5) is based on the traditional pin-hole camera model. A practical use of the plots of FIGS. 4*a*-*g* is to estimate the blur kernel when the subject is moving.

Figure 4A:
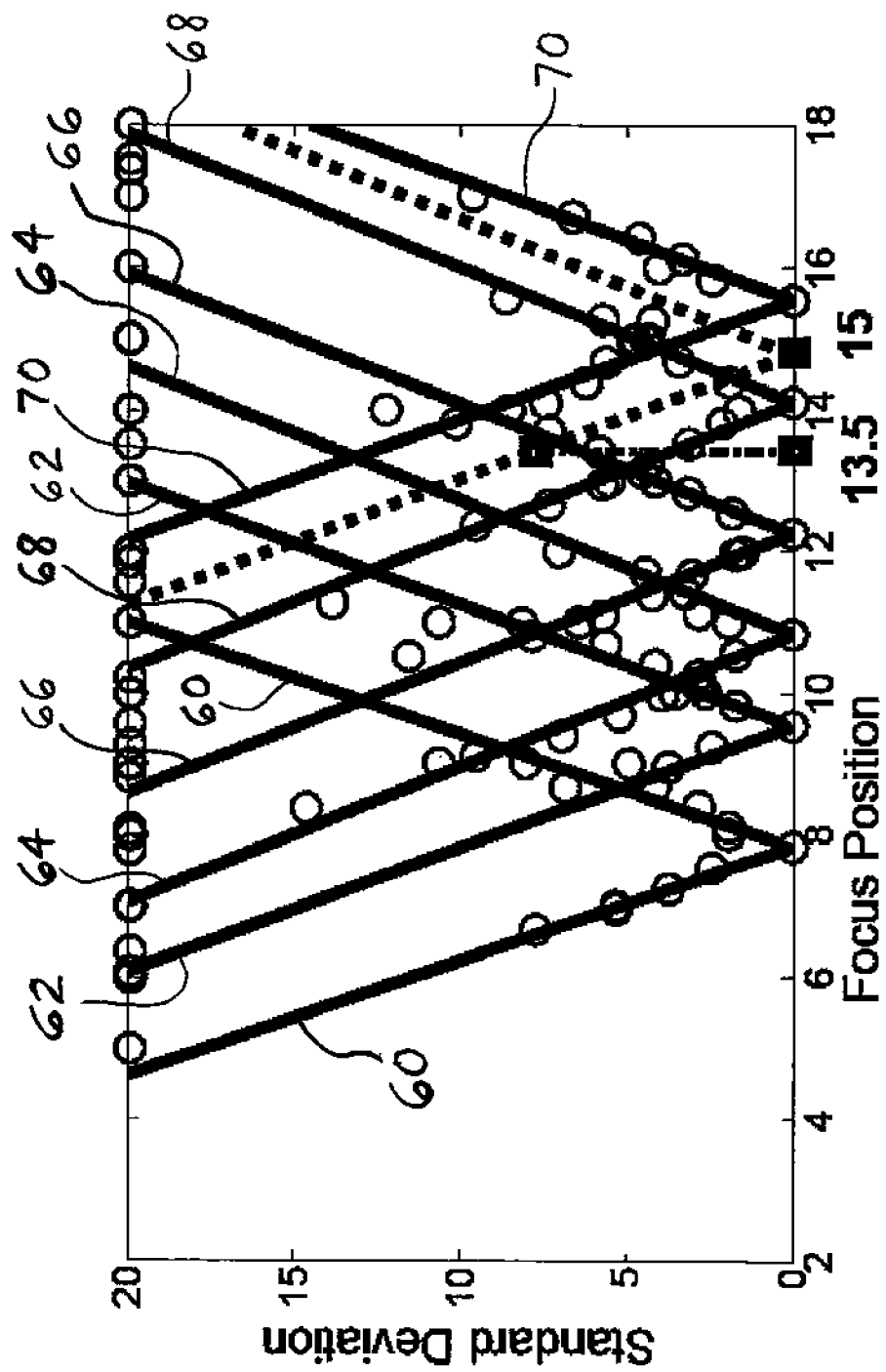
FIG. 4a illustrates examples of plots of the standard deviation of the blur kernel Gaussian distribution as a function of the focus position of the camera of the system of FIG. 1 for various distances between the camera and the iris according to one embodiment of a method of the present invention for visually recognizing an iris.
Figure 4B:
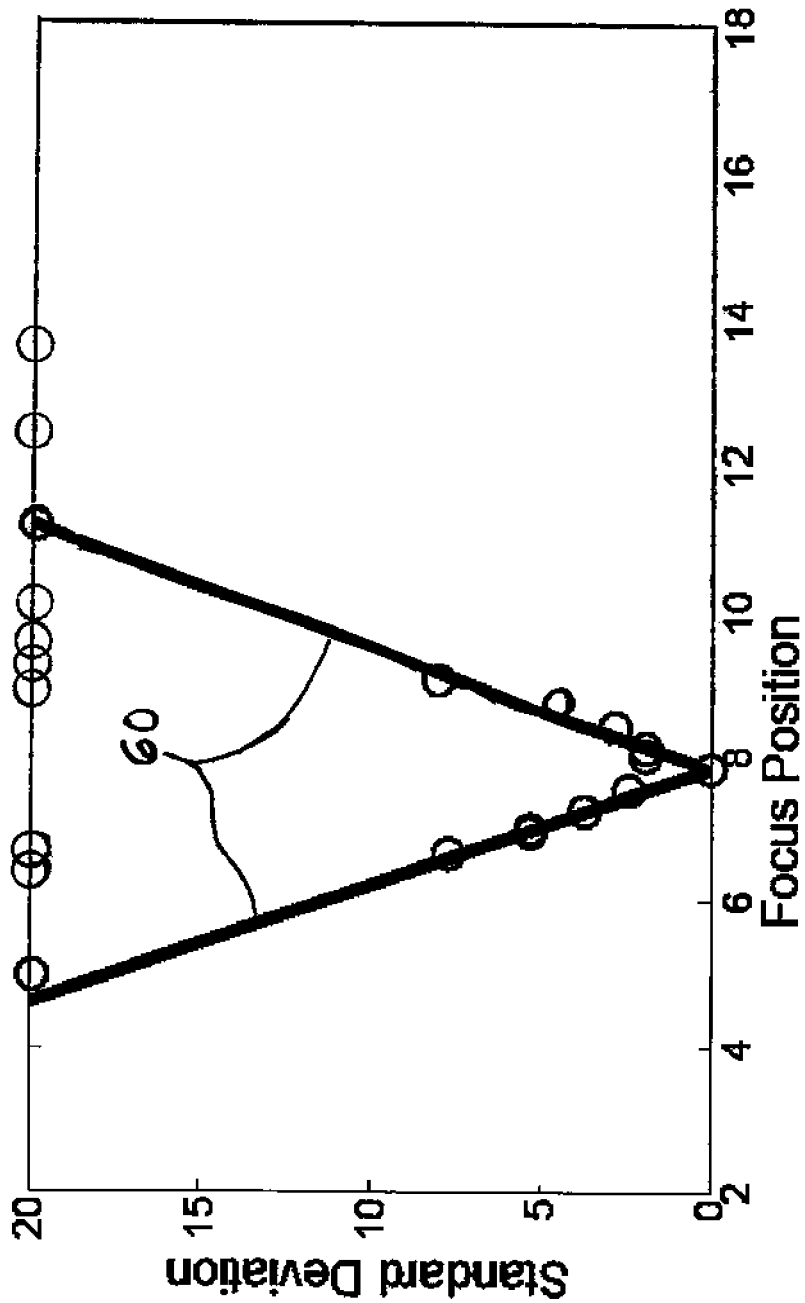
FIG. 4b is the plot of FIG. 4a corresponding to a distance of 3.30 meters between the camera and the iris.
Figure 4C:
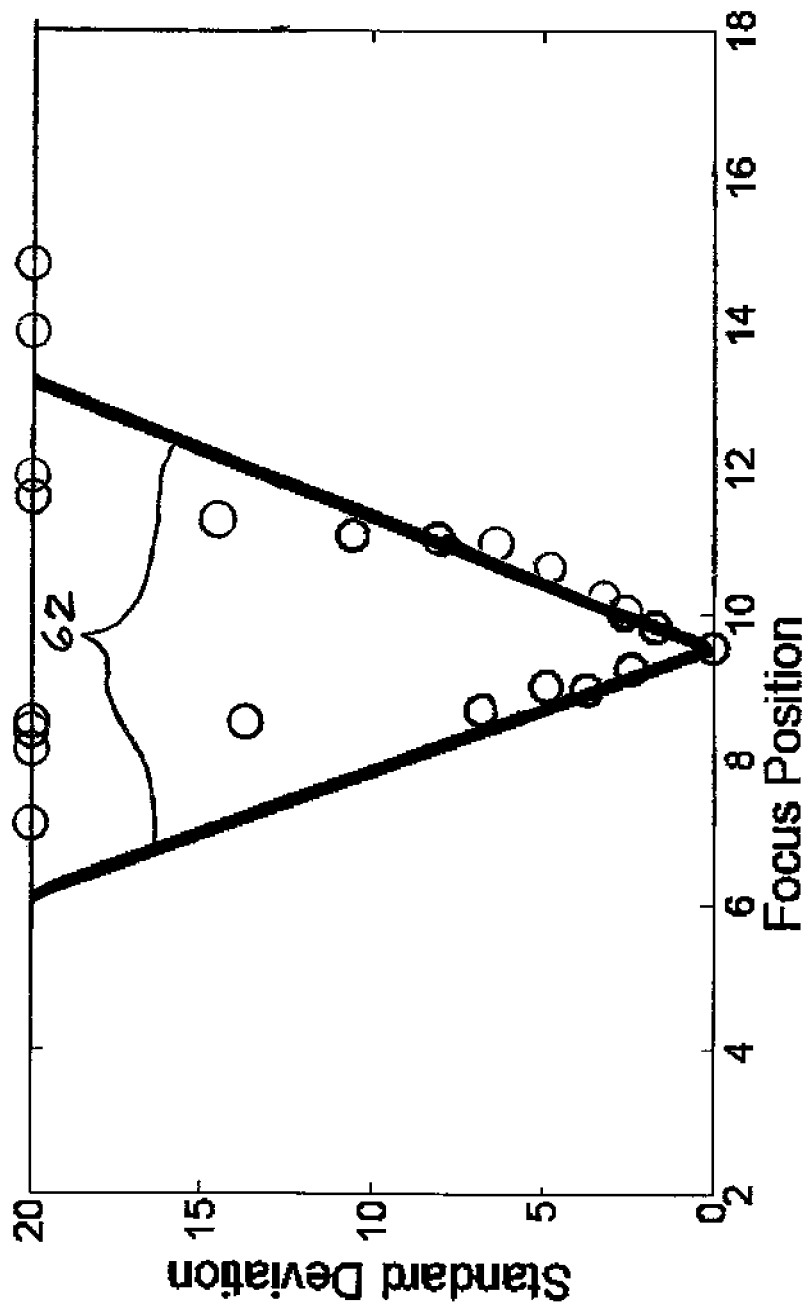
FIG. 4c is the plot of FIG. 4a corresponding to a distance of 2.97 meters between the camera and the iris.
Figure 4D:
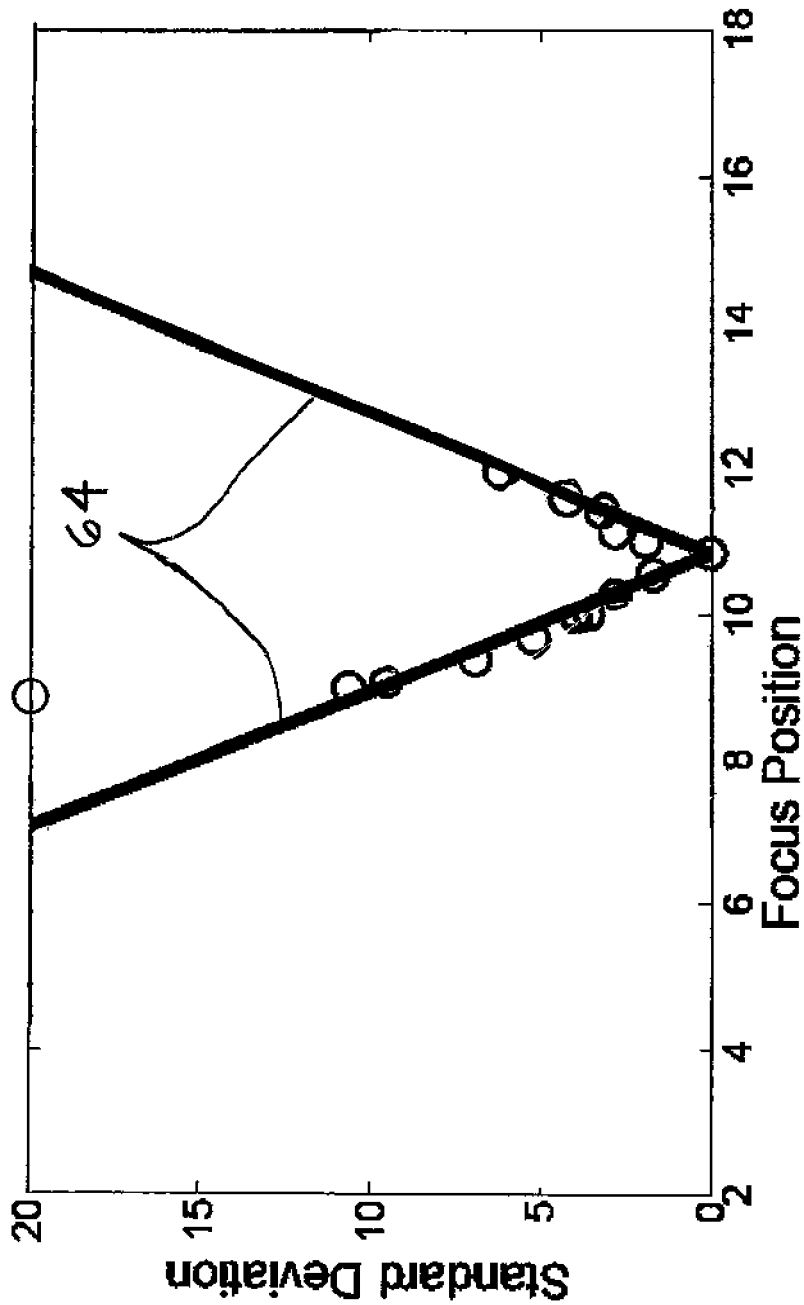
FIG. 4d is the plot of FIG. 4a corresponding to a distance of 2.56 meters between the camera and the iris.
Figure 4E:
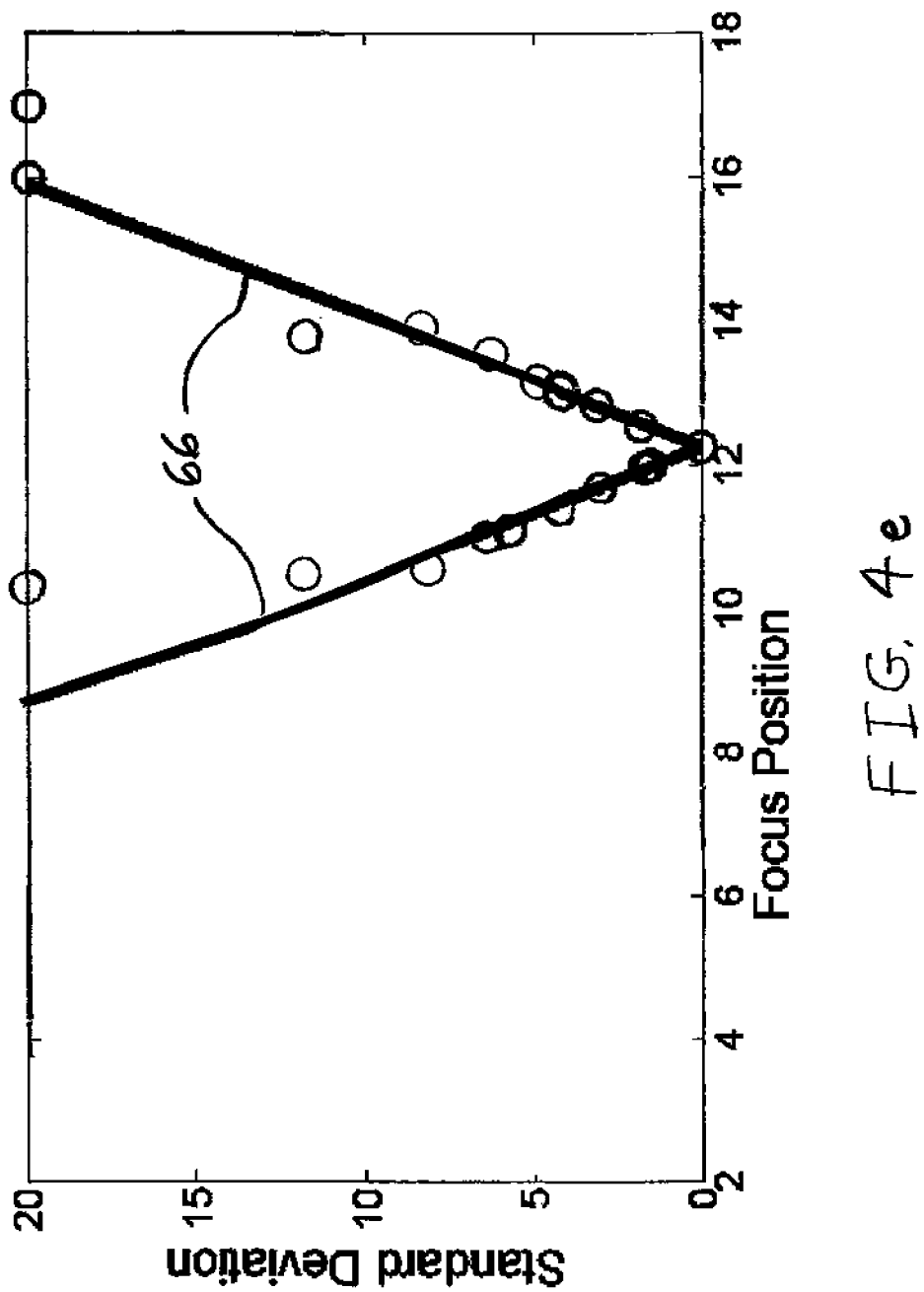
FIG. 4e is the plot of FIG. 4a corresponding to a distance of 2.00 meters between the camera and the iris.
Figure 4F:
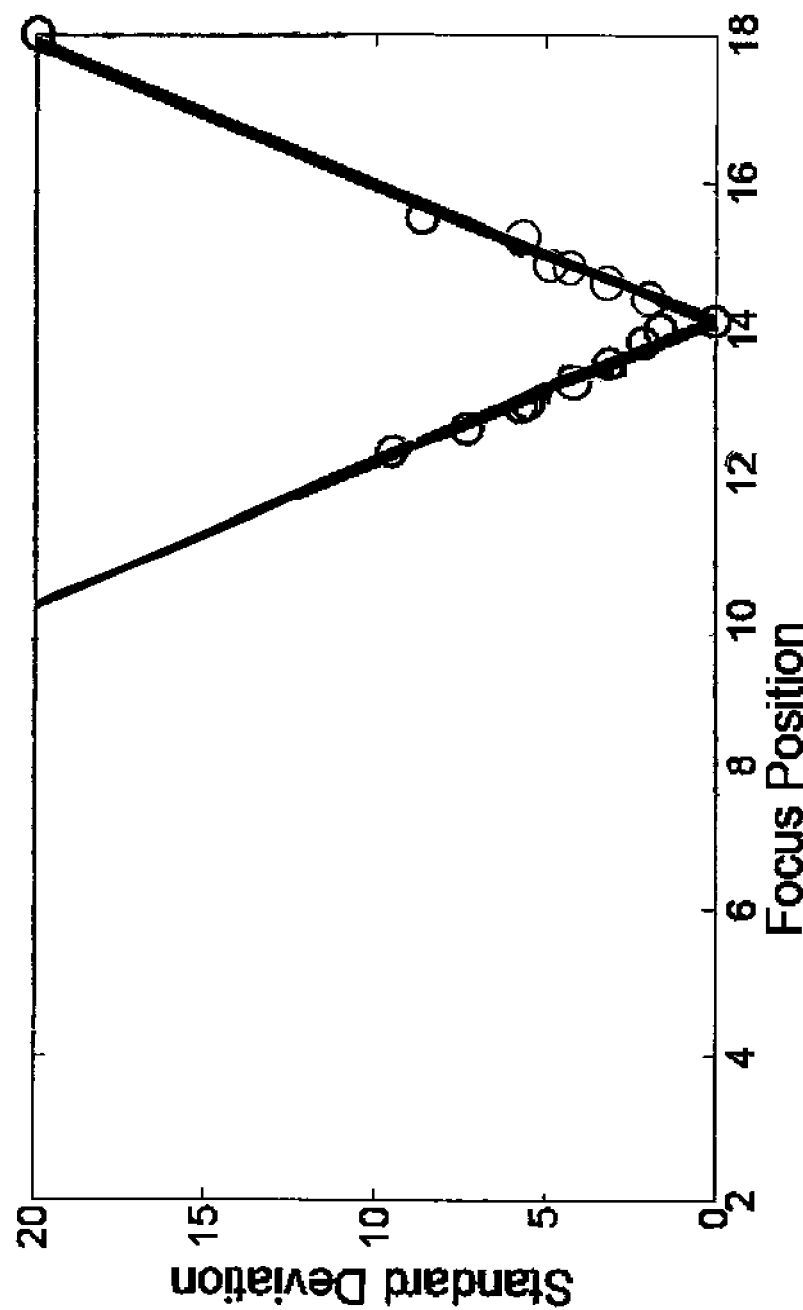
FIG. 4f is the plot of FIG. 4a corresponding to a distance of 1.58 meters between the camera and the iris.
Figure 4G:
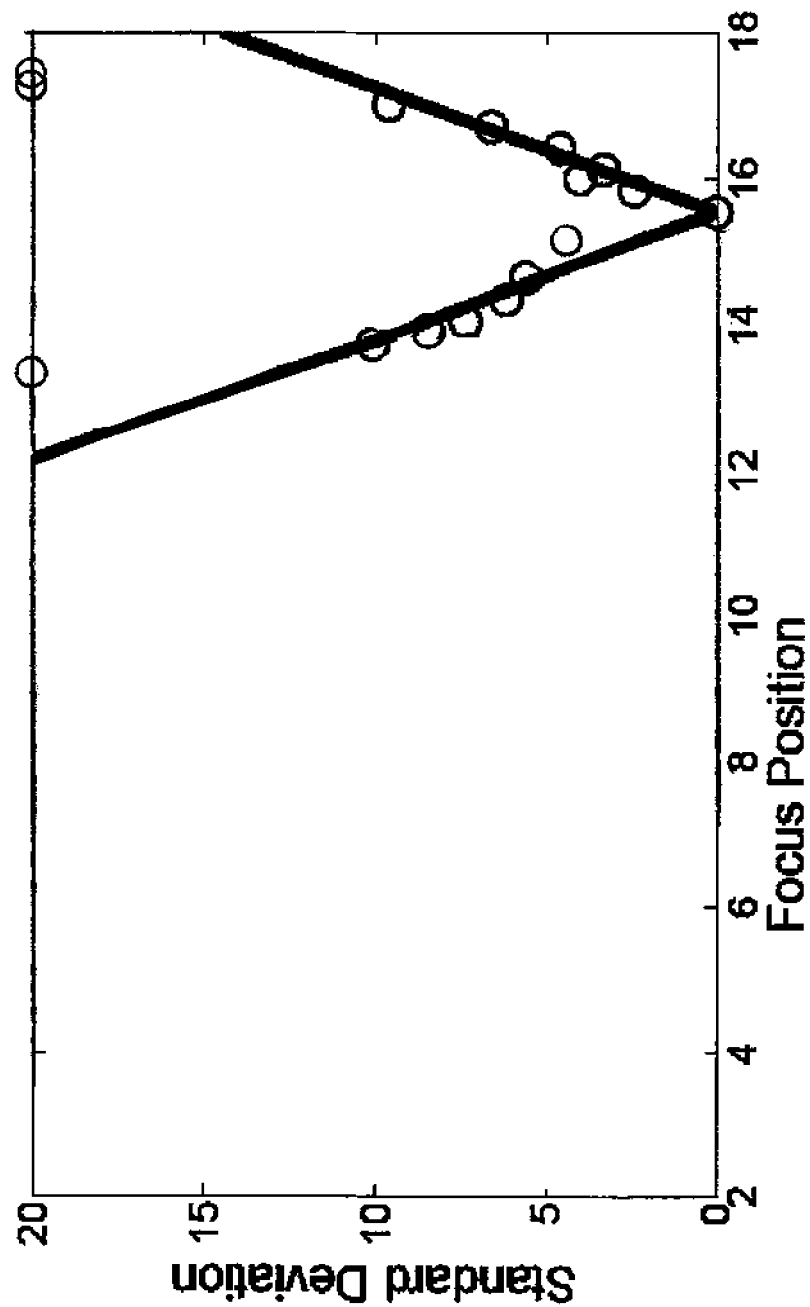
FIG. 4g is the plot of FIG. 4a corresponding to a distance of 1.43 meters between the camera and the iris.
Figure 4H:
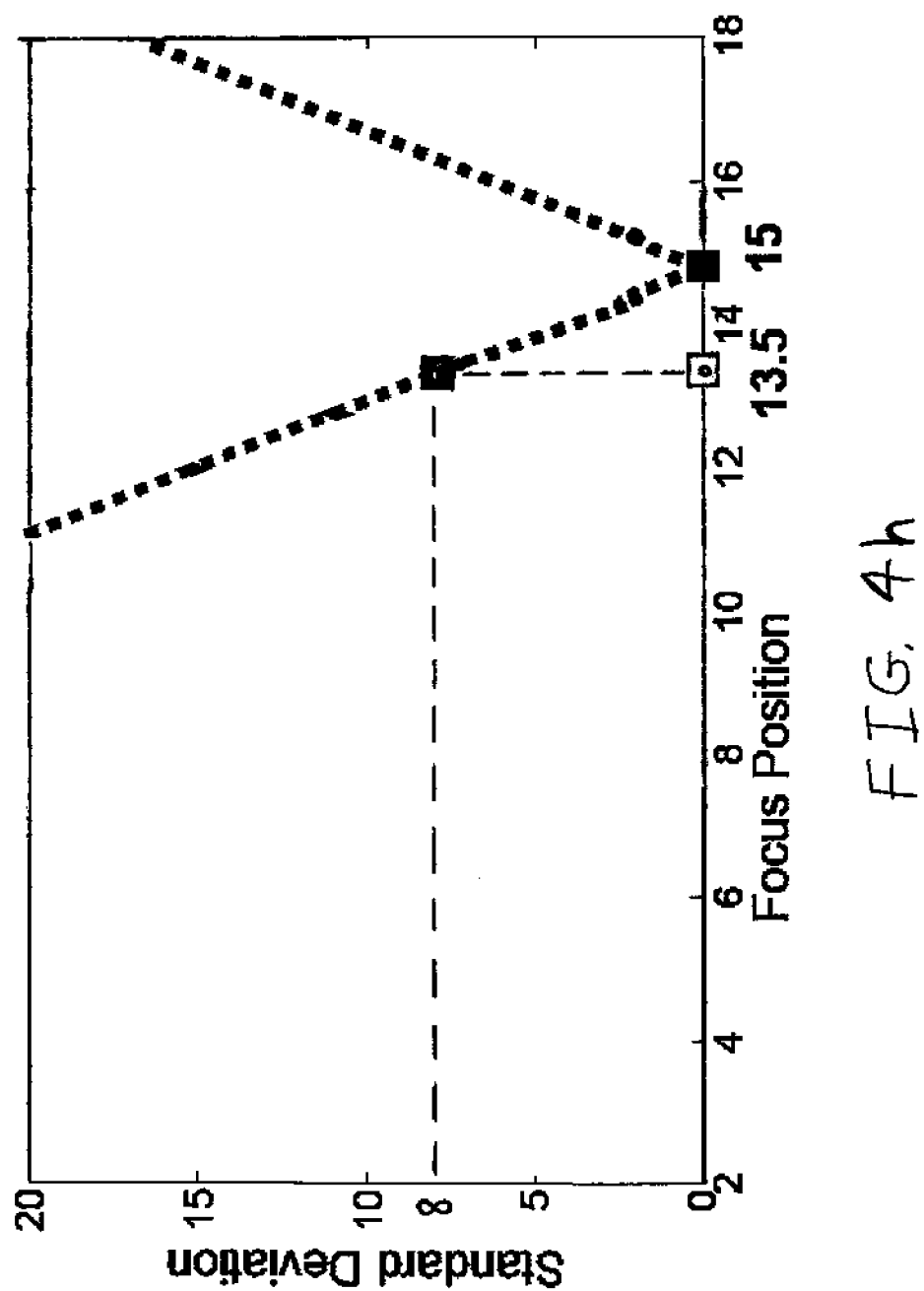
FIG. 4h is a plot illustrating how a standard deviation defining a blur kernel distribution appropriate for deblurring may be calculated according to one embodiment of a method of the present invention.

When a user enters the field of view of the capturing system, the three-dimensional position of the user's eyes after the system delay may be predicted. When the predicted eye position satisfies the triggering condition, the predicted in-focus position $\tilde{p}_f$ is computed using Equation (4) and the image is produced at this position. The correct (i.e., actual) depth at the time of image capture (after the system delay) is measured, and the correct or ideal in-focus position $\bar{p}_f$ corresponding to the actual depth measurement is computed. For example, assuming the correct or ideal in-focus position $\bar{p}_f$ is 15 (as shown as the origin of the V-shaped plot in FIG. 4*h*) for an actual, measured depth, a new model can be interpolated (i.e., Equation (5) with different values for $k_3$ and $k_4$). The new model is illustrated as the dashed V-shaped plot originating at focus position 15 in FIG. 4*h*. Assuming the predicted in-focus position $\tilde{p}_f$ that was actually used to produce the iris image is 13.5, as indicated by the rectangle at 13.5 in FIG. 4*h*, the standard deviation $\sigma_h$, that defines the blur kernel distribution appropriate for use in deblurring is shown to be approximately 8 in FIG. 4*h*. The standard deviation $\sigma_h$ may be computed by taking the predicted focus position of 13.5 that was actually used to produce the image, and plugging that value of 13.5 into Equation (5) along with the values of $k_3$ and $k_4$ that correspond to the actual depth measurement (i.e., the actual depth measurement that corresponds to an ideal focus position of 15).

The above-described calculation of the blur kernel Gaussian distribution may be used to unblur a captured blurred image as described in detail below. Particularly, the process of image deblurring may be formulated in the Bayesian framework by Bayes' theorem, $$P(L|\sigma_h, I) \propto P(I|L, \sigma_h) P(L)$$

where $P(I|L,\sigma_h)$ is the likelihood that L is the clear image given a blur kernel defined by a Gaussian distribution that is, in turn, defined by a standard deviation $\sigma_h$. $P(L)$ represents the prior on the un-blurred image L. A prior probability, or a "prior," is a marginal probability, interpreted as what is known about a variable in the absence of some evidence. The posterior probability is then the conditional probability of the variable taking the evidence into account. The posterior probability may be computed from the prior and the likelihood function via Bayes' theorem.

Different priors chosen in this framework may lead to different deblurring algorithms with different performances. The novel iris deblurring algorithm of the present invention may be applied in any iris capture system to handle defocus blur. The prior on the un-blurred image L may depend upon three prior components that are based on global and local iris image statistics:

$$P(L) = P_g(L) P_p(L) P_s(L).$$

The first prior $P_g(L)$ may be computed from an empirically-determined global distribution of the iris image gradients; $P_p(L)$ may be computed based on characteristics of dark pupil region; and $P_s(L)$ may be computed from the pupil saturation region (i.e., the highlight region of the pupil that is saturated with intensity values of high brightness). For general image deblurring, the global distribution of iris image gradients may be approximated by a mixture of Gaussian distributions, exponential functions, and piece-wise continuous functions. Mixture Gaussian distributions are described in "Removing camera shake from a single photograph", R. Fergus, B. Singh, A. Hertzmann, S. T. Roweis, and W. T. Freeman, ACM Transactions on Graphics, 2006; exponential functions are described in "Image and depth from a conventional camera with a coded aperture", A. Levin, R. Fergus, F. Durand, and W. T. Freeman, ACM Transactions on Graphics, 2007; and piece-wise continuous functions are described in "High-quality motion deblurring from a single image", Q. Shan, J. Jia, and A. Agarwala, In SIGGRAPH, 2008, each of which is incorporated by reference herein in its entirety.

Figure 5:
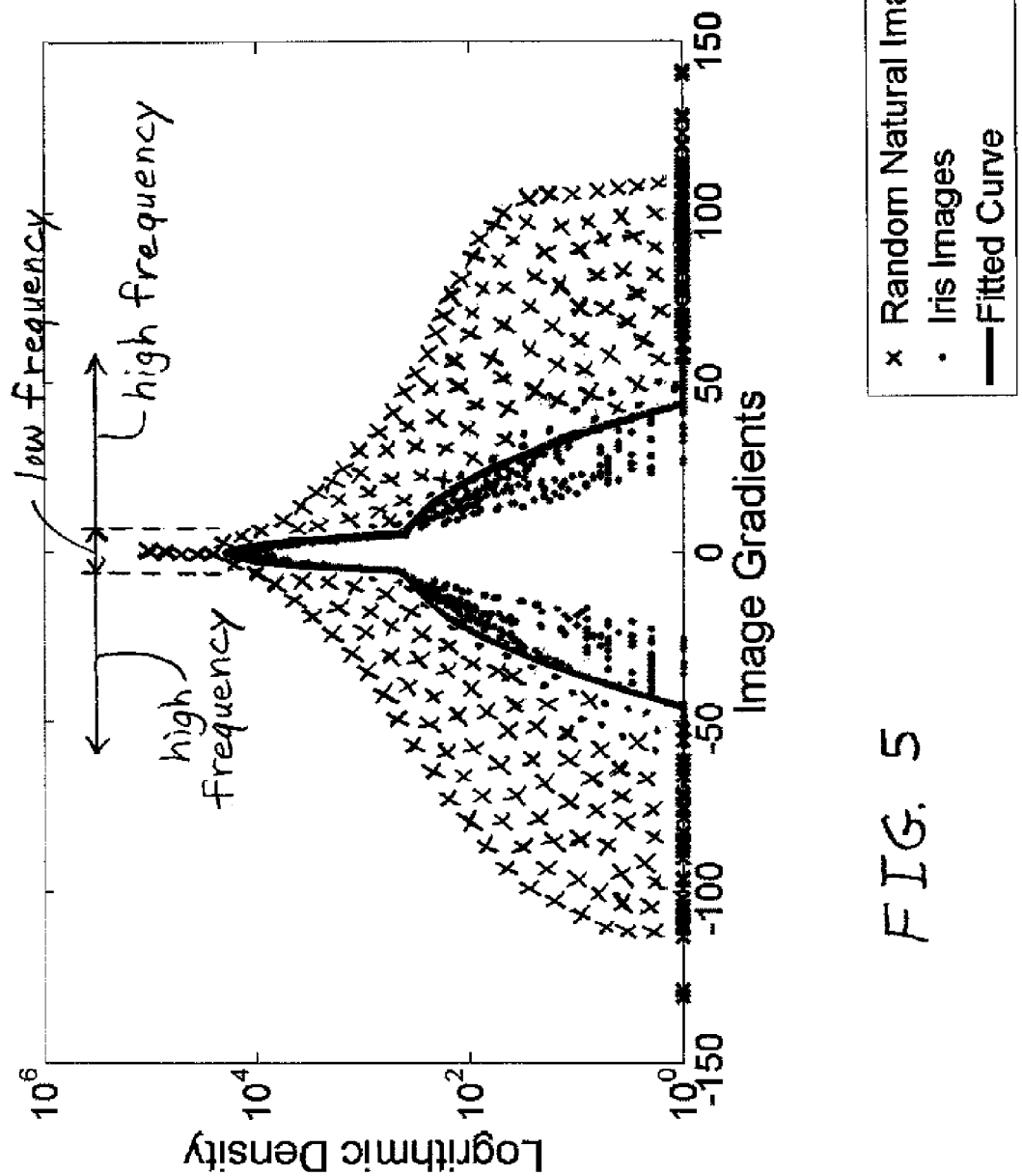
FIG. 5 is a plot of the distributions of image gradients of random natural images and of global iris images.

Because the application domain is iris images rather than natural images, according to one embodiment of the present invention, the global distribution may be computed from iris images only. As illustrated in FIG. 5, the distribution of general natural images (i.e., any images found in nature, such as sky, water, landscape) has a greater uncertainty than the distribution of global iris images. The present invention takes advantage of the tight range of the global iris image statistics.

As a result of the tighter iris image statistics, the distribution of iris image gradients is a stronger prior. A two-piecewise quadratic function (i.e., a piecewise quadratic function having two separate, continuous portions) may be used to approximate the distribution so that the optimization based on this Bayesian problem becomes simpler and more efficient. A general form of the two-piecewise quadratic function may be:

$$P_g(L) \propto \begin{cases} \prod_i e^{a_1 (\partial L_i)^2 + b_1}, & |\partial L_i| \le k \\ \prod_i e^{a_2 (\partial L_i)^2 + b_2}, & |\partial L_i| > k \end{cases}$$

where $\partial L_i$ is the gradient for a pixel and k is the threshold between two functions. Such a two-piecewise quadratic function may be represented by the fitted curve in FIG. 5, wherein the threshold k is at the transitions between the low frequency and high frequency regions.

The second $P_p(L)$ and third $P_s(L)$ priors may be computed from the local pupil region because the dark pupil region is likely to be smooth as compared with the nearby iris patterns, and the highlight region is likely saturated. Therefore, these two priors may be particularly useful in recovering nearby iris patterns. As the smooth pupil region tends to have small gradients that are not sensitive to the defocus blur, and the saturated highlight region tends to contain the highest intensity, the two priors may be computed as following:

$$P_p(L) \propto \prod_{i \in \Omega_1} N(\partial L_i - \partial I_i \mid 0, \sigma_p)$$

$$P_s(L) \propto \prod_{i \in \Omega_2} N(L_i - 255 \mid 0, \sigma_s),$$

where $\Omega_1$ is the dark pupil region (i.e., excluding the highlight region), and $\Omega_2$ is the saturated highlight region within the pupil. The dark pupil region and the saturated highlight region within the pupil can be detected by image processing techniques, such as thresholding, erosion and dilation. The 255 term in the $P_s(L)$ formula represents the highest (i.e., whitest) color value on a scale of 0 to 255.

Putting all of these priors together, this iris deblurring problem may be solved by minimizing an energy function E in the following quadratic form:

$$E \propto \|I - L \otimes h\|^2 + \lambda_1(\|a_1(\partial L)^2 + b_1\| \cdot M_1 + \|a_2(\partial L)^2 + b_2\| \cdot M_2) + \lambda_2(\|\partial L - \partial I\|^2 \cdot M_3 + \|L - 255\|^2 \cdot M_4),$$

where $M_1$, $M_2$, $M_3$, and $M_4$ are masks of low-frequency region, high-frequency region, dark pupil region, and highlight region in the pupil; I is the known blurred image captured by the camera lens; h is the blur kernel, which may be estimated as discussed in detail above; and L is the clear image that is being determined. Thus, given known values for the blurred image I and the blur kernel h, an image L may be determined that minimizes E, and this image L may be used as a representation of a clear, unblurred version of the produced blurred image I.

The deblur kernel h can be estimated based on the depth information or focus scores. If the blur kernel is not known, it is possible to add a Gaussian prior in place of the blur kernel in order to convert the non-blind deconvolution into a blind one, which still can be solved by the optimization framework.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of identifying a living being, comprising the steps of:
   using a time-of-flight sensor to determine a 3D location of a face of the living being, wherein the time-of-flight sensor determines depth information of the face;
   producing with a camera an image of an iris of the living being, the producing being dependent upon a focus position of the camera and the location of the face using the depth information as determined by the time-of-flight sensor;
   modifying he produced image of the iris by estimating a blur kernel based on the depth information of the face and/or iris image distribution statistics; and
   processing the produced image to determine an identity of the living being.

2. The method of claim 1 wherein the time-of-flight sensor is included in a hardware configuration that performs the producing and processing steps, the hardware configuration producing images of irises of living beings with different heights without using other devices such as a pan-tilt unit to change positions and directions of a camera and the sensor and without a need for the living being to adjust its height.

3. The method of claim 1 wherein the producing step includes:
   adjusting a focal position of a camera based on the location of the face of the living being; and
   using the camera with the adjusted focal position to capture the image of the iris of the living being.

4. The method of claim 1 comprising the further steps of:
   determining whether the living being is within a field of view of the camera based on the location of the face of the living being;
   determining whether the living being is within a depth of field such that the produced iris image has an iris diameter larger than 150 pixels; and
   deciding, based on the determining steps, whether to capture the image of the iris of the living being.

5. The method of claim 1 comprising the further step of using the time-of-flight sensor to ascertain a 3D or 2D shape of the face of the living being, the determination of the identity of the living being partially based on the ascertained shape of the face of the living being.

6. The method of claim 1 wherein the iris image distribution statistics include at least one of iris image gradients, characteristics of dark pupil regions, and characteristics of saturation regions within a pupil.

7. The method of claim 6 wherein the producing with a camera comprises producing the image of the iris with a narrow-depth-of-field camera.

8. A method of identifying a living being, comprising the steps of:
   using a time-of-flight sensor to determine a 3D location of a face or eye of the living being;
   producing an image of an iris of the living producing being dependent upon the location of the face as determined by the time-of-flight sensor; and
   processing the produced image to determine an identity of the wherein the producing step includes the substeps of:
   using a camera to capture a visual representation of the iris of the living being; and
   modifying the captured visual representation based on a focus position of the camera while capturing the visual representation and based on the location of the face of the living being during the capturing, wherein the modifying substep includes estimating a blur kernel based on the focus position of the camera while capturing the visual representation and/or based on the location of the face of the living being during the capturing, the method comprising the further step of calculating a focus position based on the location of the face of the living being, the estimating of the blur kernel being based in part on the optimal focus position and/or the calculated focus position.

9. A system for identifying a living being comprising the steps of:
   a time-of-flight sensor positioned to sense a face of the living within a predetermined space;
   a camera positioned to capture an image of an iris of the living being within the predetermined space; and
   a processor in communication with each of the time-of-flight sensor and the camera, the processor being configured to:
   receive information about a location of the face of the living being from the time-of-flight sensor;
   determine whether one eye or two eyes of the living being are within the field of view of the camera;
   receive the captured image from the camera;
   estimate a defocus blur kernel;
   determine whether the captured image needs to be modified;
   modify captured image; and
   determine an identity of the living being based on the captured or modified image,
   wherein the camera is configured to capture a visual representation of the iris of the living being, the processor being configured to modify the captured visual representation based on a focal length of the camera while capturing the visual representation and based on the location of the face of the living being during the capturing; and wherein the camera is configured to determine whether the captured image needs to be modified based on the estimated blur kernel, the processor being configured to estimate a blur kernel based on the focus position of the camera while capturing the visual representation and/or based on the location of the face of the living being during the capturing.

10. The system of claim 9 wherein the processor is configured to adjust a focus position of the camera:
based on the location of the face of the living being; and
before the camera captures the image of the iris of the living being.

11. The system of claim 10 wherein the processor is configured to:
determine whether the living being is within a field of view of the camera based on the location of the face of the living being;
determine whether the living being is within a depth of field such that the captured iris image has an iris diameter larger than 150 pixels; and
decide whether the camera should capture the image of the iris of the living being based on the determination of whether the living being is within the field of view of the camera.

12. The system of claim 9 wherein the processor is configured to calculate a focus position based on the location of the face of the living being, the estimating of the blur kernel being based in part on the optimal focus position and/or the calculated focus position.

13. The system of claim 9 wherein the processor is configured to:
use readings from the time-of-flight sensor to ascertain a 2D or 3D shape of the face of the living being; and
determine the identity of the living being based partially on the ascertained shape of the face of the living being.

14. A method of identifying a living being, comprising the steps of:
using a time-of-flight sensor to ascertain a shape of a face of the living being;
capturing an image of an iris of the living being; and
determining an identity of the living being based on the ascertained shape of the face of the living being and based on the captured image of the iris of the living being, wherein the capturing step includes the substeps of:
using a camera to obtain a visual representation of the iris of the living being;
determining whether the captured iris image needs to be modified based on an estimated blur kernel; and
modifying the visual representation based on a focus position of the camera while obtaining the visual representation and based on a location of the face of the living being, as sensed by the time-of-flight sensor, during the obtaining, wherein the modifying substep includes estimating a blur kernel based on a focal length of the camera while obtaining the visual representation and/or based on the location of the face of the living being during the obtaining, the method comprising the further step of calculating a focus position focal length based on the location of the face of the living being, the estimating of the blur kernel being based in part on the optimal focus position and/or the calculated focus position.

15. The method of claim 14 comprising the further step of adjusting a focus position of a camera based on a location of the face of the living being as sensed by the time-of-flight sensor, the camera with the adjusted focus position being used to capture the image of the iris of the living being.

16. The method of claim 15 comprising the further steps of:
determining whether the living being is within a field of view of the camera based on the location of the face of the living being;
determining whether the living being is within a depth of field such that the captured iris image has an iris diameter larger than 150 pixels; and
deciding whether to capture the image of the iris of the living being based on the determining step.

17. The method of claim 14 wherein the time-of-flight sensor and a narrow-field-of-view camera are calibrated based on computing intrinsic and extrinsic matrices.

18. The method of claim 14 wherein the time-of-flight sensor and a narrow-field-of-view camera are calibrated based on a convex hull constructed from collected 3D points.

* * * * *